United States Patent [19]

Court et al.

[11] Patent Number: 4,602,888
[45] Date of Patent: Jul. 29, 1986

[54] FLEXIBLE METALLIC JOINT

[75] Inventors: André Court, Pierrelatte; Raymond de Villepoix, Donzére; Robert Forges, Bolléne; Claude Abbes, St. Etienne; Fernand Bacchis, Sorbiers; Christian Rouaud, Bourg St. Andeol, all of France

[73] Assignee: Commissariat a l'Energie Atomique, Paris, France

[21] Appl. No.: 615,157

[22] Filed: May 30, 1984

[30] Foreign Application Priority Data

Jun. 7, 1983 [FR] France .................. 83 09431

[51] Int. Cl.⁴ ............................. F16J 15/00
[52] U.S. Cl. ........................ 403/28; 403/220; 403/229; 277/164; 277/205; 277/236; 267/158; 267/1.5
[58] Field of Search ................ 403/28–30, 403/372, 229, 220; 267/158–164, 166, 136, 1.5; 277/205, 206, 236, 164

[56] References Cited

U.S. PATENT DOCUMENTS

| 3,192,690 | 7/1965 | Taylor | 277/205 |
| 3,575,432 | 4/1971 | Taylor | 277/206 R |
| 3,751,048 | 8/1973 | Rode | 277/205 |
| 4,114,907 | 9/1978 | Abbes et al. | 277/206 R |
| 4,121,843 | 10/1978 | Halling | 277/206 R X |
| 4,188,037 | 2/1980 | Abbes et al. | 277/236 X |
| 4,218,067 | 8/1980 | Halling | 277/205 |
| 4,381,869 | 5/1983 | Abbes et al. | 277/236 |
| 4,445,694 | 5/1984 | Flaherty | 277/205 X |

FOREIGN PATENT DOCUMENTS

| 486217 | 9/1952 | Canada | 277/164 |
| 1650026 | 11/1967 | Fed. Rep. of Germany . | |
| 2433592 | 1/1976 | Fed. Rep. of Germany | 403/372 |
| 1409193 | 7/1965 | France . | |
| 2119258 | 8/1972 | France . | |
| 2151186 | 4/1973 | France . | |
| 2414158 | 8/1979 | France . | |
| 6407937 | 9/1965 | Netherlands | 277/206 |

OTHER PUBLICATIONS

"Neuartige Zylinderkopfdichtungen fur Hochleistungsmotoren", pp. 384–391 *p. 388, figure 12; p. 389, colonne de gauche paragraphes 2,3* MTZ–Motortechnische Zeitschrift, vol. 31, No. 9, 1970, Stuttgart (DE).

Primary Examiner—Cornelius J. Husar
Assistant Examiner—Todd G. Williams
Attorney, Agent, or Firm—Oblon, Fisher, Spivak, McClelland & Maier

[57] ABSTRACT

The invention relates to a flexible metal joint in which two envelopes surrounding a metal core. The joint has, along its periphery which does not have an opening, at least two bosses, at which the envelope is not in contact with the joint core. A relative displacement between the flanges of the assembly between which the joint is secured consequently has no effect on the efficiency thereof.

6 Claims, 4 Drawing Figures

FLEXIBLE METALLIC JOINT

BACKGROUND OF THE INVENTION

The present invention relates to a flexible metallic joint of the type comprising at least one elastic metal core having, when in the rest state, a toroidal shape, and at least two envelopes in which are fixed said metal core, each envelope being open along one of the peripheries of the metal core.

In metal joints of this type, the toroidal elastic core is either constituted by a metal tube or by a helical spring having contiguous turns and which is closed on itself. In the latter case, the cross-section of the wire constituting the spring can be of a random nature and particularly round, rectangular or in the form of a circular segment. The tube or helical spring, which is fixed on the site, gives the joint its elasticity.

The envelope surrounding the core of existing joints of this type are constituted by materials in plated or thin sheet form, such as polytetrafluoroethylene, aluminium, silver, copper, nickel, tantalum, stainless steel, zirconium, etc.

Each of the envelopes has a particular function. Thus, when the core of the joint is constituted by a spring with contiguous turns, the inner envelope generally serves to distribute the load at each turn apex of the elastic core. The outer envelope is made from a ductile metal which, due to its capacity to flow into the contacting surface unevennesses, gives the joint a perfect seal when locked into an assembly. In general terms, it is therefore the plastic properties of the materials forming them which characterize the envelopes of the joint.

It should also be noted that the existing metal joints generally have a toroidal shape whilst the envelopes gripping round the elastic core also generally have the shape of a toroidal surface, whose generating circle does not close on itself. An illustration of joints, whereof the elastic core is constituted by a helical spring with contiguous turns, is provided by French patent application No. 7,319,488, filed May 29th 1973 in the name of the Commissariat à l'Energie Atomique, now French Pat. No. 2,232,235.

Industrial experience has shown that these elastic metal joints are satisfactory for numerous applications. However, in the case where the assemblies are subject to differential radial displacements or movements between the flanges, the initially obtained seal can lose its effectiveness.

These differential movements are encountered whenever the flanges of the assembly are made from heterogeneous or anisotropic materials, or from homogeneous materials when the temperature rise or fall conditions are not homogeneous for the complete assembly. In practice, these conditions are very frequently encountered.

In order to analyse the behaviour of existing flexible metal joints under the aforementioned conditions, reference is made to FIG. 1 which, in cross-sectional form, shows an existing flexible metallic joint 10 secured between two flanges A and B.

More specifically, FIG. 1 shows in exemplified manner a joint 10, whose elastic core is constituted by a helical metal spring 12 having contiguous turns, said spring being fixed in an inner first envelope 14, which is itself fixed in an outer second envelope 16. References $P_1$ and $P_2$ designate the contact points of the outer envelope 16 of the joint 10 respectively with flanges A and B, after the assembly has been secured.

If it is assumed that flange A expands more than flange B following the securing of the assembly, point $P_1$ of flange A passes to $P'_1$. During this displacement, the outer envelope 16 of the joint 10 is stressed whereby it undergoes stretching and then sliding, because that part of the outer envelope 16 whose length is defined by points $P_1$ and $P_2$ is jammed against the helical metal spring 12 and cannot be subject to elongation without damaging the joint 10. This leads to a loss of sealing for the joint 10 and this can be increased if the phenomenon is repeated in one or other direction and with a variable amplitude throughout the life of the assembly.

SUMMARY OF THE INVENTION

The present invention aims at obviating this disadvantage of existing flexible metal joints, whilst enabling all the layers forming the envelopes of the joint to follow the differential radial displacements between flanges A and B by sliding on the elastic core of the without differential displacement at the contacts between the joint outer envelope 16 and the flanges A and B.

According to the invention, this result is obtained by means of a flexible metal joint of the type defined hereinbefore, wherein each envelope has, along the periphery of the metal core opposite to the opening of said envelope, at least two bosses where said envelope is not in contact with the metal core, each boss having in section a radius of curvature substantially 5 to 10 times less than the radius of the metal core, two of the bosses being located in the vicinity of the opposite contact surfaces of the joint, the latter having substantially a square cross-section.

As a result of this feature, the length in section of the envelopes 14 and 16 between the points $P_1$ and $P_2$, as defined in FIG. 1, exceeds the value which it would have in the case of existing joints, which enables these envelopes to follow the relative displacements of the flanges without sliding with respect thereto. Thus, there is no stretching of the metal and no loss of sealing of the joint.

According to a preferred embodiment of the invention, the envelopes are open along the same periphery of the metal core and each has at least two bulges or bosses along the other periphery of the metal core.

According to another feature of the invention, the bosses are preferably arranged along the inner periphery of the joint.

BRIEF DESCRIPTION OF THE DRAWINGS

The invention is described in greater detail hereinafter relative to non-limitative embodiments and with reference to the attached drawings.

DETAILED DESCRIPTION OF THE INVENTION

Figure 1:
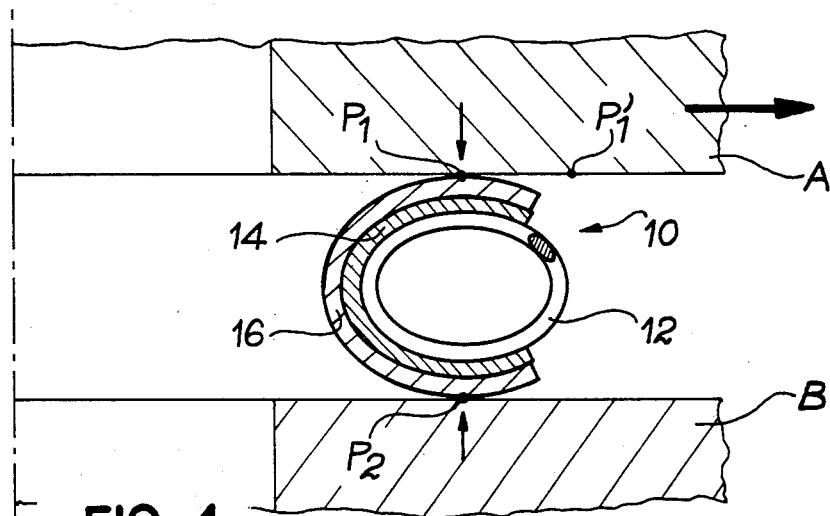
FIG. 1, already described, shows in cross-section a known flexible metal joint secured between two flanges.
Figure 2:
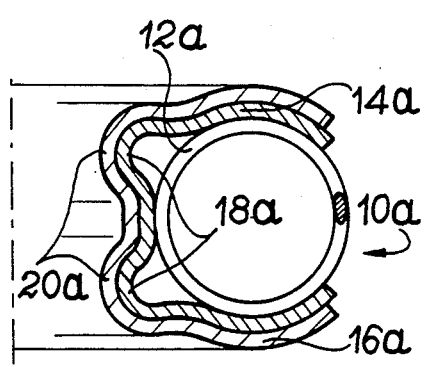
FIGS. 2 and 3 show in cross-section, two constructional variants of the invention in the case of a joint having a single sealing line comprising two superimposed envelopes having two differently shaped bosses.

FIG. 2 shows the various components of the known joints, of the type described hereinbefore with reference to FIG. 1. In particular, joint 10a shown in FIG. 2 comprises an elastic core constituted by a helical metal spring 12a having contiguous turns, fixed in a first or inner envelope 14a, which is itself fixed in a second or outer envelope 16a.

According to the invention, each of the envelopes 14a, 16a has, along the inner periphery of the joint, two expansion bend-like bosses respectively 18a, 20a for the inner and outer envelopes. At these bosses or bulges, the envelopes are not in contact with the elastic core (which, in the illustrated case, is the helical metal spring 12a) even when the joint 10a is crushed in the assembly.

More specifically, in the embodiment of FIG. 2, the envelopes 14a, 16a are located in the same direction around the helical metal spring 12a, so that the generating circle of each of the envelopes is not closed on itself at the outer periphery of the joint 10a and the bosses 18a, 20a are positioned within one another and opposite to the open side of the envelopes, i.e. along the inner periphery of the joint 10a.

According to the invention, the two bosses 18a, 20a of each envelope are arranged symmetrically on either side of the median plane of the joint 10a. More specifically, they are located in the immediate vicinity of the contact zones of the joint 10a with the flanges A, B of the assembly, in such a way that the joint section is substantially square. The force necessary for the flange to cause a possible radial displacement of the two envelopes is consequently minimized.

Moreover, the radius of curvature in section of the bosses 18a, 20a is much smaller than the radius of the helical metal spring 12a and is preferably 5 to 10 times smaller than the latter, which prevents excessive stiffening of the joint 10a.

Finally, it should be noted that the presence of at least the two envelopes 14a, 16a is necessary for the purposes of the invention. Thus, a single envelope must be ductile in order to obtain the necessary seal. The locking of the joint has the effect of encrusting the spring in the envelope, which virtually prevents any sliding of the envelope on the spring without destruction of the envelope.

Figure 3:
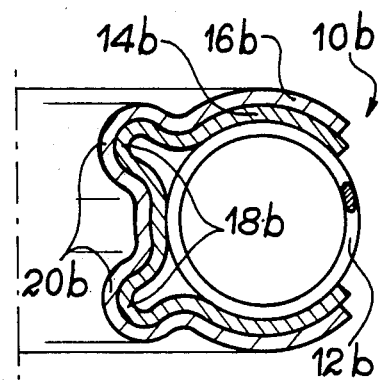

Joint 10b of FIG. 3 is similar to joint 10a of FIG. 2, with the exception of the differently shaped bosses, the envelope bosses being more elongated in FIG. 3 than in FIG. 2. Moreover, all the components of joint 10b are designated in FIG. 3 by the same reference numeral in FIG. 2, but followed by b instead of a. These components will not be described again.

Figure 4:
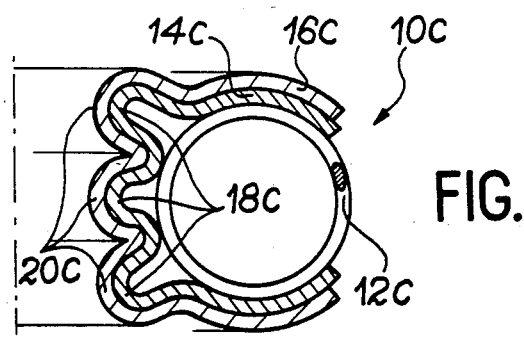
FIG. 4 shows in cross-section, a flexible metal joint according to the invention with a single sealing line comprising two envelopes having three bosses.

FIG. 4 shows another embodiment of the joint according to the invention, said joint 10c having a single sealing line and constructed in the same way as the joints of FIGS. 2 and 3, except that the inner and outer envelopes 14c, 16c respectively, have in each case three bosses 18c, 20c instead of two. These bosses 18c, 20c are located along the inner periphery of the joint.

In this case, two of the bosses 18c, 20c of each envelope are arranged symmetrically on either side of the median plane of the joint, as in the embodiments of FIGS. 2 and 3, whilst the third boss 18c and 20c is positioned between the two other bosses, along the median plane of the joint and symmetrically with respect to said plane.

As in the variants shown in FIGS. 3 and 4, like in the case of FIG. 2, the radius of curvature in section of each boss is approximately 5 to 10 times smaller than the radius in section of the joint core. Moreover, two of these bosses are located in the immediate vicinity of the bearing faces of the joint. Thus, the latter has a substantially square cross-section.

In all the embodiments described, it can be seen that the bosses can only be constructed opposite the zone where the generating circle of the envelopes does not close on itself. Moreover, the shape and location of the bosses must not impede the fixing of the joint in the assembly. In other words, the latter condition implies that the thickness of the joint at the bosses is at the most equal to the thickness of the joint at the elastic metal core.

According to the invention and no matter what the embodiment of the joint, it can be seen that the sought result is indeed achieved, because the presence of at least two bosses on the envelopes at the or each of the metal cores of the joint enables the envelopes to follow a possible relative displacement between the flanges of the assembly without sliding relative thereto and consequently without any sealing loss.

Thus, comparative tests performed on a prior art joint and on a joint of the same size according to the invention made it possible to reach with the latter a limiting temperature of 140° C. instead of 110° C. for the prior art joint, the permissible radial displacement between the flanges being increased from 0.43 to 0.57 mm.

It is obvious that the number and shape of the bosses can be modified within the previously defined limits without impairing the obtaining of this result. In the same way, it is of little importance whether the flexible metal joint has two or more envelopes surrounding the elastic metal core. The elastic metal core can be differently constructed from the helical spring described and can in particular be in the form of a metal tube. In addition, the joint according to the invention can in plan view have a random configuration, i.e. it can be circular, substantially square or rectangular without passing beyond the scope of the invention.

What is claimed is:

1. A flexible joint having two opposite contact surfaces that are designed to be secured between two opposite flanges, said flexible joint comprising:
   (a) an elastic core that has a toroidal shape, the cross-section of said elastic core having a plane of symmetry that is perpendicular to the two flanges when the flexible joint is in use and having an inner external periphery on one side of the plane of symmetry and an outer external periphery on the other side of the plane of symmetry;
   (b) an inner envelope surrounding said elastic core and making surface contact therewith over a portion of the external periphery of said elastic core, said inner envelope having:
      (i) an opening facing one of the peripheries of said elastic core, said opening in said inner envelope being spaced from the two flanges when the flexible joint is in use, and
      (ii) at least two bosses projecting outwardly on the side of said inner envelope opposite to said opening in said inner envelope, said inner envelope being spaced from said elastic core beneath each of said at least two bosses, each of said at least two bosses having in section a radius of curvature in the range of 5 to 10 times less than the radius of said elastic core, one of said at least two bosses being located in the vicinity of each of the contact surfaces of the joint; and (c) an outer envelope surrounding said inner envelope and making surface contact therewith over a portion of the external periphery of said inner envelope, said outer envelope having:

(i) an opening facing one of the peripheries of said elastic core, said opening in said outer envelope being spaced from the two flanges when the flexible joint is in use, and (ii) at least two bosses projecting outwardly on the side of said outer envelope opposite to said opening in said outer envelope, each of said bosses in said outer envelope being sized, shaped, and positioned so that the internal periphery of each of said bosses in said outer envelope makes surface contact with the external periphery of a corresponding one of said bosses in said inner envelope.

2. A flexible joint as recited in claim 1 wherein the openings in said inner envelope and said outer envelope face the same periphery of said elastic core.

3. A flexible joint as recited in claim 2 wherein:

(a) the openings in said inner envelope and said outer envelope both face the outer periphery of said elastic core and (b) said bosses in said inner envelope and said outer envelope both face the inner periphery of said elastic core.

4. A flexible joint as recited in claim 1 wherein said elastic core is a helical metal spring.

5. A flexible joint as recited in claim 1 wherein two bosses are formed in each of said envelopes.

6. A flexible joint as recited in claim 1 wherein three bosses are formed in each of said envelopes.

* * * * *